O. G. SIMMONS.
HOBBING CUTTER.
APPLICATION FILED MAR. 22, 1917.
1,241,040.
Patented Sept. 25, 1917.
4 SHEETS—SHEET 4.
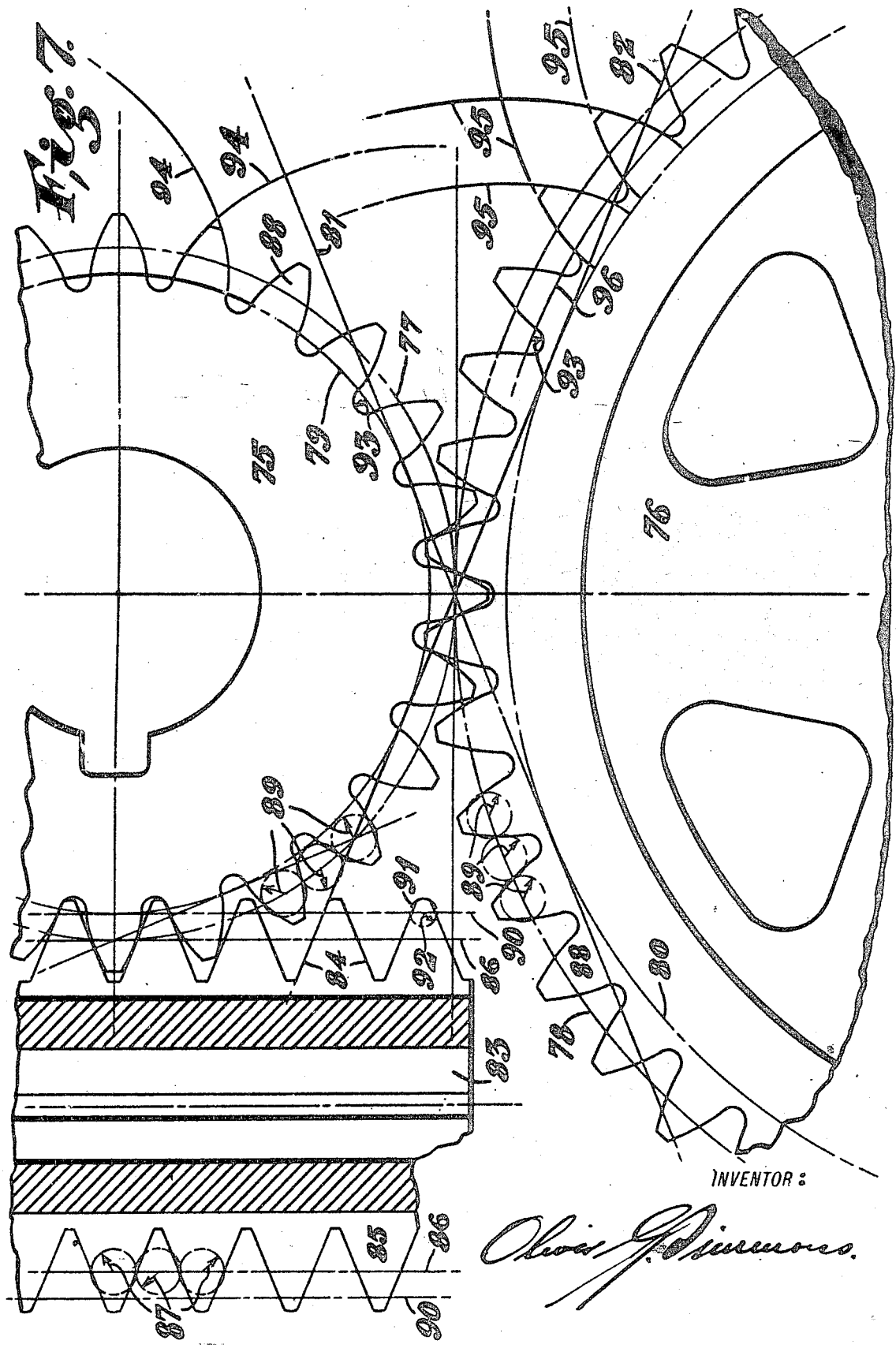
INVENTOR:
Oliver G. Simmons.

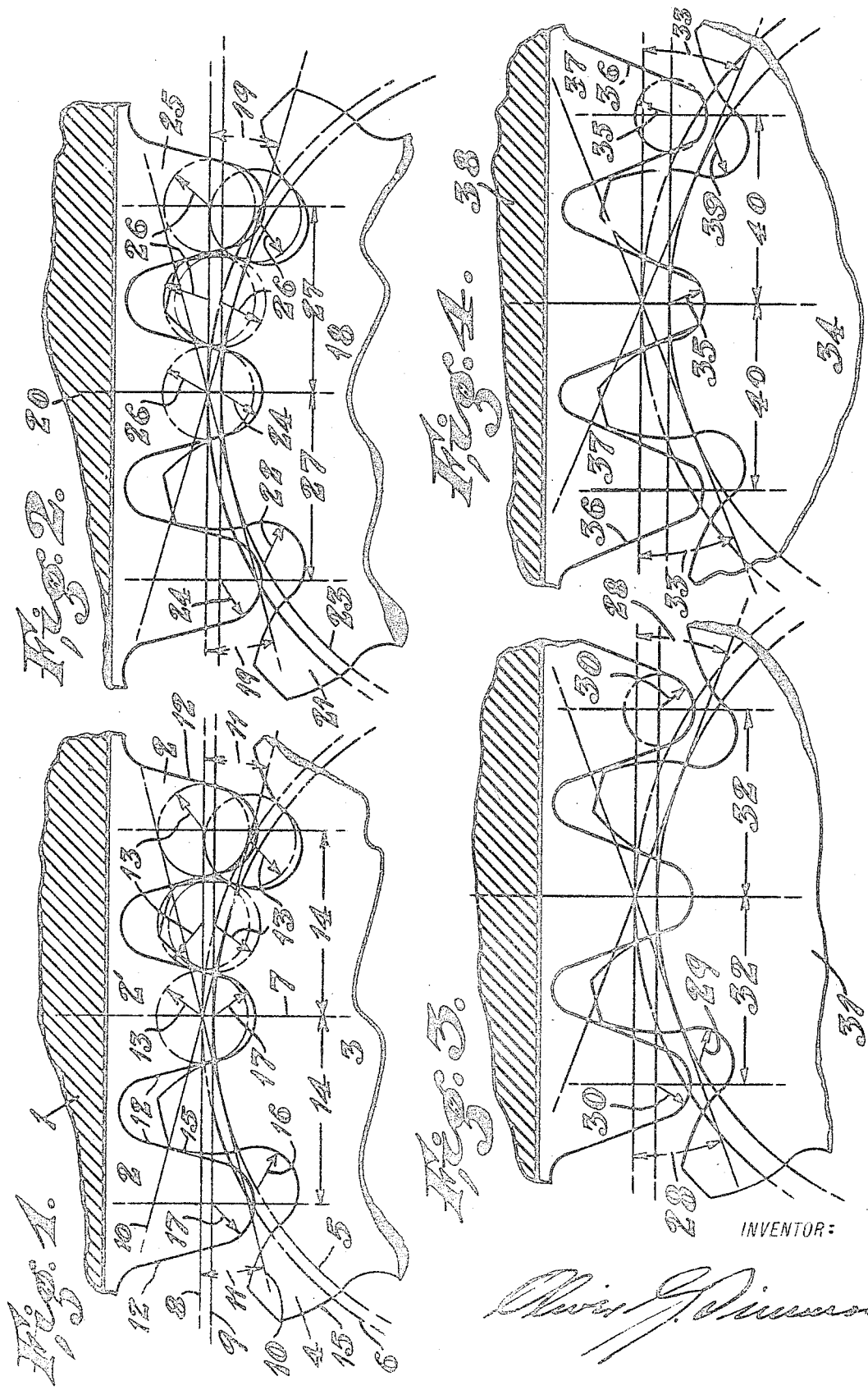

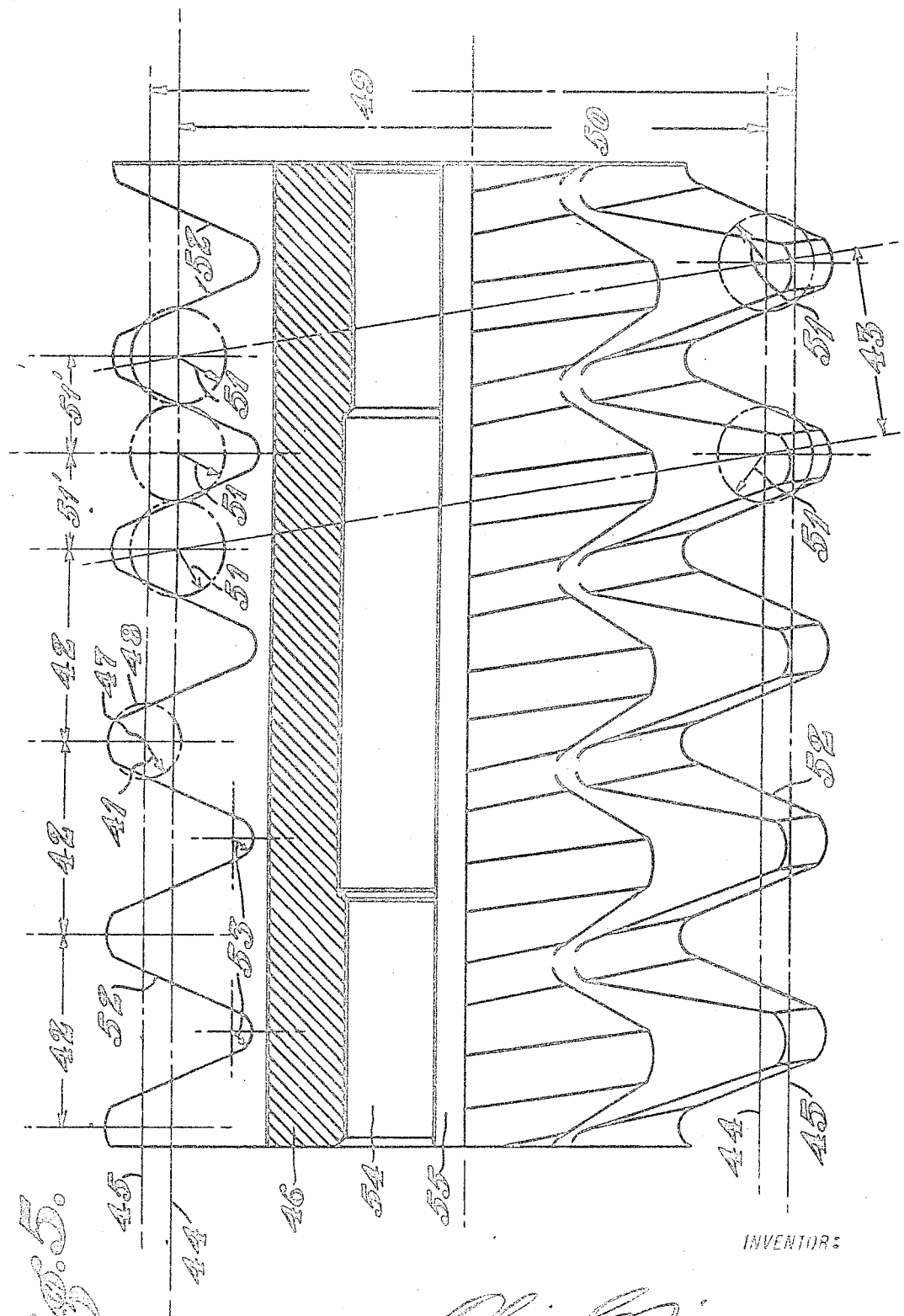

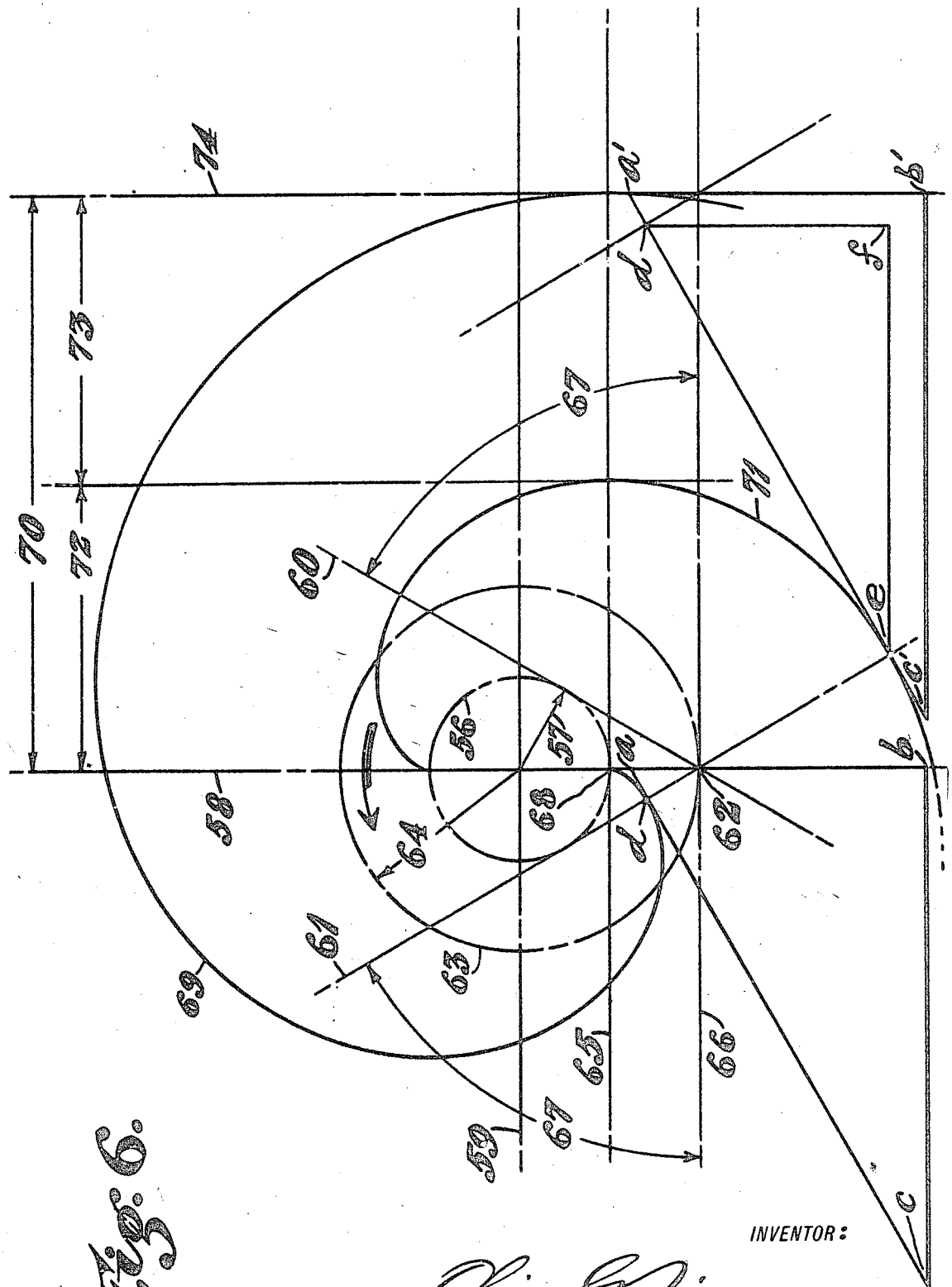

UNITED STATES PATENT OFFICE.

OLIVER G. SIMMONS, OF ROCHESTER, NEW YORK.

HOBBING-CUTTER.

1,241,040.  Specification of Letters Patent.  Patented Sept. 25, 1917.

Application filed March 22, 1917. Serial No. 156,689.

*To all whom it may concern:*

Be it known that I, OLIVER G. SIMMONS, a citizen of the United States, residing at Rochester, in the county of Monroe and State of New York, have invented a new and useful Improvement in Hobbing-Cutters, of which the following is a specification.

This invention relates to hobbing cutters for generating the teeth of gear wheels, and has special reference to a novel form of teeth for said hob whereby the teeth of gear wheels are generated having true involute curves with a lead equal to the perimeter of the base circle of the gear being cut; said involute curves forming the full face and flank of the teeth and joined by a curve, preferably circular, lying below the root or base circle of the gear adapted to be cut.

A further object of the invention consists in providing a hob, which will, in operation, result in the generation of the teeth of gears interchangeable with other gears of the same diametral pitch and system, whether such gears have been cut in a milling machine, hobbing machine, or in a gear planer, thereby avoiding any necessity for an empirical modification of the tooth or of the tooth curve.

In my application for patent on hob, Serial No. 129,670, filed November 6, 1916, it was shown that to generate a true involute curve to a base circle with a single generating point, the point would necessarily move along a line tangent to the base circle and with a movement uniform with the rotary movement of said base circle. In the case referred to, the teeth of the hob below the point could have any form provided only the involute generating point contacted with the work.

In the present case, however, it will be shown that if the sides of the teeth of the hob are inclined, the inclination must be perpendicular to the lines of pressure, and if a true involute curve is desired, the movement of the inclined tooth, which is the construction of the typical rack tooth, will have a lineal movement along a line parallel to a line tangent to the base circle and uniform with the rotary movement of a circle selected greater in diameter than the diameter of the base circle.

It will be obvious in this case that in the base gear only can the involute curves extend from a point on the base circle, and that in gears larger than the base gear, the involute curves will extend from a point on a root circle as much smaller in diameter than the pitch circle, as the base circle is smaller than the pitch circle in the base gear selected.

In the application above referred to, in which the involute curves always extend from the base circle, which will require, theoretically, a hob for every change in not only the pitch, but in the number of teeth of the gear as well to maintain a constant tooth thickness, measured on the imaginary pitch circle, thereby resulting in a varying pressure angle, the maximum, the angle selected, being in two base gears in mesh and gradually diminishing until the rack is reached in which case the pressure line of the rack coincides with the line tangent to the base circle of the base gear in mesh with the rack.

The present invention, therefore, provides the structural means to cut the teeth of gears on true involute curves; each curve having a lead equal to the perimeter of the base circle of the gear being cut, of an extent from the base or root circle, as the case may be, to the periphery of the gear; and of cutting the curved clearance space joining the involute curves at the base or root circle; using a single hob for any size gear of the given pitch and system, as will hereinafter be more fully described.

I will now proceed to describe my invention and to demonstrate the accuracy of the principle involved, having reference to the accompanying drawings, in which—

Figure 1, is a fragmentary section of a hob and base gear—the pinion of 12 teeth has been selected in the view shown—in engagement; the hob embodying the invention as it would appear when designed upon a pressure angle of 14½ degrees.

Fig. 2, is similar to Fig. 1, except that a pressure angle of 15 degrees is used.

Fig. 3, is similar to Fig. 1, but based upon a 20 degree pressure angle.

Fig. 4, is also similar to Fig. 1, but in this view a pressure angle of 22½ degrees is used.

Fig. 5, is a plan elevation, partly in section, of my improved hob.

Fig. 6, is a diagrammatic view to show that the sides of a rack tooth, if straight, and inclined perpendicularly to the pressure angle lines, and in contact with a true involute curve, must have a uniform lineal movement relative to the rotary movement of a circle larger than the circle used as the evolute of the involute in contact.

Fig. 7, is an elevation of a base gear having an addendum equal to 1⅛ module in mesh with a larger gear and in mesh also with a fragmentary section of my hob.

Referring now to Fig. 1, the numeral 1, indicates the hob provided with the teeth 2. The numeral 3 indicates the base gear having twelve teeth indicated by the numeral 4. The base circle is indicated by the numeral 5 and the pitch circle by the numeral 6. The numeral 7, indicates a center line of the gear 3, the extension of which is the median line of the tooth 2' of the hob 1. The pitch line of the hob 1, is indicated by the numeral 8, while the numeral 9 indicates the base line. It will be observed that the pitch line 8, of the hob 1, is tangent to the pitch circle 6 of the base gear 3, and further, that the base line 9 of the hob 1 is likewise tangent to the base circle 5, of the gear 3.

A line, therefore, such as the line 10, if constructed tangent to the base circle 5 and intersecting the point of intersection of the lines 7 and 8, which is also the point of tangency of the pitch line 8 and the pitch circle 6, will form a pressure angle line and the angle 11, as indicated, will be the pressure angle. In the view shown, I have made this angle 11, equal to 14½ degrees. The cutting sides 12, of the teeth 2, therefore, are constructed perpendicular to one of the pressure angle lines 10 as shown, so that the included angle formed by the sides 12, of the teeth 2, will equal twice the pressure angle 11, as is well understood by those skilled in this art.

In all systems of gearing, it is necessary to have the thickness of the tooth measured on the pitch circle, equal to one-half of the circular pitch, in order that the gears of equal diametral pitch may be interchangeable with one another. The thickness of the teeth 4, measured on the pitch circle 6, of the gear 3, have, therefore, been made in accordance with this practice as the circles with radii 13, indicate.

It follows from the above that the thickness of the teeth 2, of the hob 1, measured on the pitch line 8, should be equal to one-half of the circular pitch of the gear to be cut. My hob, therefore, is constructed accordingly as shown by the circles having equal radii 13. The numeral 14, will, from the above, indicate the measure of the actual pitch of the hob which equals the circular pitch of the gear.

The gear 3, Fig. 1, as shown, with the teeth 4, provided with true involute curves with a lead equal to the perimeter of the base circle forming the faces 15 of the teeth and provided further with a curved clearance space, preferably semicircular, having the radius 16, has been fully described in my application for patent on involute gear, Ser. No. 97,530, filed May 15th, 1916, suffice it to say, therefore, that since the peripheral portion of the tooth of the hob is necessarily complemental to the curved clearance space, it will be of the same form with a radius 17, equal to radius 16, the center of the curve of which will lie upon the base-line 9, of the hob 1.

It will be noted in Fig. 1, that as a small pressure angle is shown, the sides 12, of the teeth 2, of the hob, approaching as they do more closely to a line parallel to such as the vertical line 7, than would sides disposed at a greater angle, it is not apparent that the peripheral curve of the teeth of the hob intersects the sides 12. This will be obvious later when Fig. 4, is considered.

It is further to be noted that when a small pressure angle is employed, a smaller addendum than that shown will be necessary when a true involute curve is to form the full face and flank of the tooth and joined by the circular clearance space from a point on the base circle of the base gear shown in Fig. 1. The addendum used in the base gears of Fig. 1, Fig. 2, Fig. 3 and Fig. 4, is equal to ⅝ of the diametral pitch, a two diametral pitch being used.

In Fig. 2 is shown a base gear 18, with a pressure angle 19 equal to 15 degrees. The hob 20 is shown in mesh with the gear 18 as it would appear after having generated the teeth 21, and the uniform single curve clearance space with the radius 22, struck from a point on the base circle 23 of the gear 18. The radii 24 of the tops of the teeth 25 of the hob are equal to the radius 22 as previously described.

The thickness of the teeth and space between, of the hob and gear, measured on the pitch line and pitch circle respectively, are equal, as indicated by the equal radii 26 of the circles shown. The numeral 27 indicates the measure of the actual pitch of the hob as previously explained.

In Fig. 3, the pressure angle 28, has been made equal to 20 degrees, and due to this pressure angle, relatively greater than those previously considered, it is noted the radius 29, of the clearance curve, is considerably smaller than the radius 16, for instance, of Fig. 1. The radius 30, of the top of the hob tooth, Fig. 3, will equal, of course, as previously described, the radius 29 of the base gear 31, and the numeral 32 will indicate the pitch measure of the hob. It is now apparent that the construction of an ideal tooth for all-round service is being approached, and reference is, therefore, made to Fig. 4, in which the numeral 33, indicates the pressure angle equal to 22½ degrees, which pressure angle was proposed, I understand, by Mr. Wilfred Lewis in the early nineties and is now used especially in gears for rolling mill work in which the tooth curves are formed on the arcs of circles similar to Mr. Geo. B. Grant's odontograph system for approximating true involute curves. The root clearance of the rolling mill pinion is provided for according to the practice established by the Brown and Sharpe Mfg. Co., except that more liberal fillets are used; that is to say, large fillets join the circular arcs of adjacent teeth the other ends of which in turn join each other or an intermediate line depending upon the pitch of the gear. The gears of the figures previously described and the gear 34, Fig. 4, are constructed upon the structural means as described in my application for patent on involute gear above referred to, having true involute curves with a lead equal to the perimeter of the base circle, forming the faces and flanks of each tooth and joining these true involute curved teeth, from a point on the root or base circle, with a single arc of a circle and which approximates a semi-circle. That, I affirm, is new and novel and the advantages of such construction will be well understood by those skilled in this art.

It is now seen, Fig. 4, that the radius 35 is the radius of a circle which cuts or intersects the sides 36 of the teeth 37 of the hob 38, and, as in Figs. 1, 2 and 3, the radius 35 equals radius 39, and that the numeral 40 indicates the actual pitch of the hob equal to the circular pitch of the gear.

The above is again apparent in Fig. 5 in which the radius of the top of the hob tooth is indicated by the numeral 41. In this view a full size hob is shown for a two diametral pitch gear, in which the numeral 42 indicates the actual pitch and the numeral 43 the normal pitch. In hobs of coarse pitches and small diameters causing a large helix angle, the normal pitch of the hob should equal the circular pitch of the gear and when a hob of this type is used, the flutes or gashes of the hob should be in the form of a helix of greater lead making it perpendicular to the helix of the thread at the pitch line as is well understood. In the hob shown the flutes are straight which is sufficient for the purposes of this application, as the fluting of the hob forms no part of this invention. It is to be understood, however, that in practice, when above conditions are met, I will gash the hob to form a helix perpendicular to the helix of the thread having a normal lead or pitch, as the case may be, equal to the circular pitch of the gear to be cut.

The numeral 44, Fig. 5, indicates the pitch line and the numeral 45 the base line of the hob 46. As previously explained, the center 47, of the circle 48, having radius 41, will lie upon the base line 45. If the base line and pitch line are considered as lines of surface, the surfaces would be cylindrical having diameters as indicated by the numerals 49 and 50, respectively, at points taken.

The thickness of the teeth of the hob, Fig. 5, measured on the pitch line 44 equals the space between said teeth as indicated by the numeral 51 as the radii of the equal circles shown, having diameters equal to the measure 51'.

The sides 52, of the hob are, as previously described, perpendicular to the line of pressure and any form of clearance 53 may be used for the roots of the teeth of the hob. The hob is provided with the usual bore 54, and key-way 55, adapting same to be secured to an arbor of a hobbing machine.

Reference is now made to Fig. 6, with which it will be proven that if a hob, having teeth the sides of which are disposed perpendicular to the line of action, the lineal movement of the same should be uniform with the rotary movement of a circle larger than the base circle and along a straight line tangent to said larger circle if a true involute curve with a lead equal to the perimeter of the base circle is to be generated by said inclined sides of the teeth. It will also be shown that there is only one larger circle for every base circle, the diameter of which is dependent upon the angle of the pressure lines and the diameter of the base circle. Conversely, the diameter of the base circle is determined by the diameter of the larger circle and the angle of the pressure lines.

Referring now to Fig. 6, the numeral 56 indicates an imaginary base circle with radius 57. The numeral 58 indicates a vertical center line and the numeral 59 a horizontal center line of the circle 56. The said center lines 58 and 59 are perpendicular to each other. A line 60 is constructed on an angle of 30 degrees to the vertical line 58 and tangent to the circle 56. The line 61 is constructed similar to the line 60, and will, therefore, intersect the vertical line 58 at the common point 62. The circle 63 is constructed from the center of the circle 56 with a radius 64 intersecting the line 58 at the common point 62. The line 65 is parallel to line 59 and tangent to the circle 56. In a like manner the line 66 is parallel to line 65 and tangent to the larger circle 63. It is now evident that the larger circle 63 is twice as large as the smaller circle 56, and that the measure of the radius 57 is equal to one-half of the measure of the radius 64. It is apparent that the circle 56 may be termed the base circle and the circle 63 the pitch circle and the lines 60 and 61 the pressure lines in which event the angle 67 would become the pressure angle. The line 65 then, would become the base line and the line 66 the pitch line. From the point 68, the intersection of the vertical line 58 and the base circle 56, the involute curve 69 is generated having a lead 70 equal to the perimeter of the base circle 56. It is now obvious that since the pitch circle 63 is twice the size of the base circle 56 the lead of the involute curve of the pitch circle 63 would be twice the lead 70 of the involute curve 69 of the base circle 56 for the reason the perimeter of the pitch circle 63 is just twice as much as the perimeter of the circle 56. It therefore holds that a rack tooth must have inclined straight lines forming its faces if it is to engage the involute curve 69 and move uniformly in contact with said involute curve a lineal distance corresponding and equal to the lead of the involute curve, not shown, of the larger circle 63, for one turn of the circle 56. From the above it is apparent that the side of the tooth in contact with the involute curve 69, for any given length of contact, must be the hypotenuse of a right-angled triangle and in length equal to twice the height of the side forming the altitude of the triangle. It is evident that such a triangle must have angles of 60, 30 and 90 degrees, and since the altitude is the short side, the angle formed by this side and the hypotenuse must equal 60 degrees. Such a triangle has, therefore, been constructed with the side forming the altitude indicated by the letters a and b coinciding with the vertical center line 58. The hypotenuse has been constructed on an angle of 60 degrees to the line a—b and tangent to involute curve 69, as indicated by the letters a—c. The line c—b is parallel to the pitch line 66. The triangle a—b—c, therefore, represents one side of a rack tooth the side a—c in contact with an involute curve 69, of a circle smaller in diameter than the pitch circle 63, with which it must have uniform movement. If we now assume that the circles 56 and 63 are turned in unison upon their identical center in the direction indicated by the arrow, and if the side c—b of the triangle is properly supported on a plane parallel to the line 66 and maintained at a definite distance from the center of the circles 56 and 63, the involute curve 69 turning also with its base circle for one-half of a revolution and then stopped, the involute curve 69 will have assumed the position of the involute curve 71 and a line tangent to said involute curve, the point of tangency being also the point of intersection of the line 65 and the involute 71, will be parallel to the line 58 and the measure 72 will equal that of 73 and will, therefore, be equal to one-half of the lead 70 of the involute curve 69. Since the rack tooth triangle a—b—c is in contact with the involute curve 69, during the above movement, it will have assumed the position of the triangle a'—b'—c'; the side a'—b' is now seen to coincide with the line 74, which is removed just the measure of the lead 70 of the involute curve 69, from its original position when it coincided with the line 58, although but half a turn was made. The contact of the involute curve 69, beginning at d, was along the line a—c until stopped at the position e. It is now evident that the hypotenuse line, actually in contact, indicated by the letters d—e, is twice the length of the side d—f which is parallel to the line, or short side a' b'. The angle e—d—f, therefore, will equal 60 degrees as described previously in connection with the triangle a—b—c, and it is now evident that the line d—e, coincident with the line a' c', is perpendicular to one of the pressure angle lines and which upon inspection is found to be the line 61. It is now obvious that if a rack tooth with straight inclined sides serving as the faces of the rack tooth, the angle of inclination being equal to the pressure angle, the rack will have a uniform lineal movement with respect to the rotary movement of the pitch circle if said rack tooth is destined to generate a true involute curve having a lead equal to the perimeter of the base circle.

It is, of course, understood that the pitch circle becomes such when it intersects the pressure lines at their common point of intersection as at 62, Fig. 6.

In the above demonstration, a large pressure angle was selected in the interest of simplicity, and which has also made it apparent that in excessive pressure angles an abnormal bearing pressure would result as seen from an inspection of Fig. 6, in which the involute curve 69 is in contact with the face a—c of a rack tooth.

In no publication within my knowledge has it been demonstrated either mathematically or diagrammatically that a rack tooth moving uniformly with a pitch circle should have straight sides inclined perpendicular to the line of pressure. All of the papers on this subject simply state the above as a truth and avoid further discussion.

Some authorities have stated that if one can stretch the imagination to conceive a circle of infinite diameter, the involute of that circle would be a straight line inclined to the vertical line and the angle of inclination would be equal to the angle of pressure used. It is obvious, however, that the pressure angle has nothing whatever to do with an involute curve but is used principally to determine the base circle diameter from the given pitch circle. The base circle only can determine the involute curve, and if, on the other hand, we can imagine a circle of infinite diameter, or say the diameter of this earth, the involute curve to such a circle, so far as we could see from the surface of this globe, would be a perfectly straight line perpendicular to the surface of the globe. We know, however, from the law of the involute, which it may be convenient to restate as follows: "The involute of any evolute has a constant lead when measured on a line tangent to said evolute and is equal to the perimeter of the generating evolute", that the involute curve of a circle as large as the diameter of the earth, while seemingly a perfectly straight vertical line to us on the earth, would nevertheless be a very small part of the involute curve the lead of which would equal the perimeter of the earth.

It follows further that if we are to consider a circle of infinite diameter its involute would have an infinite lead. The periphery of such a circle could be considered a straight horizontal line and the involute of which would be a vertical line, further; the involute of a straight line is a line of infinite radius, therefore, the involute of a straight line is a perpendicular line.

The action of my hob, so far, has been considered only in connection with the base gear of twelve teeth. I deem it advisable, however, to show a base gear having a greater number of teeth in mesh with a larger gear, both of which are based upon a larger addendum than that described heretofore, and which apparently has resulted in a different tooth, but which is obviously of the same form, as a result of this invention, which will later appear.

Referring, therefore, to Fig. 7, the numeral 75 indicates the base gear of 24 teeth, 4 diametral pitch, in mesh with the gear 76 having 48 teeth and of the same diametral pitch. An addendum of 1⅛ diametral pitch has been used in the gears shown. The numeral 77 indicates the pitch circle, of the gear 75, and the numeral 78, the pitch circle of the larger gear 76. The base circles are indicated by the numerals 79 and 80.

The pressure angle lines are shown and indicated by the numerals 81 and 82. The hob 83 is shown in mesh with the gear 75 and as shown the sides 84 of the teeth 85 are inclined on an angle equal to the pressure angle. The teeth 85 of the hob are of equal thickness on the pitch line 86 as indicated by the radii 87 of the equal circles and which are equal to the thickness of the teeth 88, of the gears 75 and 76, measured on the pitch circles, as indicated by the radii 89 of the equal circles which, as previously described, are equal to the circles of the hob having radii 87. The base line of the hob is indicated by the numeral 90 from which base line is struck the circle 91, a part of which forms the top of the hob tooth cutting the sides as previously explained. The radius 92, of the circle 91, is equal to the radius 93 forming the clearance space at the root of adjacent teeth of the gear as previously described. I explained in my application for patent for involute gear, previously referred to, the method to determine the measure of the radius 93 and will, therefore, omit same here.

The involute curves 94 of the base gear 75, are shown generated to the base circle 79 and the involute curves 95, of the larger gear 76, are shown generated to the base circle 80 but only that part of the curve is used lying above the root circle 96. The root circle 96 is just as much smaller than the pitch circle 78, in the gear 76, as the base circle 79 is smaller than the pitch circle 77 in the base gear 75. The point from which the radius 93 is struck will lie upon the root circle so defined in gears larger than the base gear.

It is apparent now that while the teeth of the gears 75 and 76 look different and are different from the teeth of the gears previously considered, they are of the same form in that the true involute curve extends from the periphery of the gear to the root or base circle, which constitutes the full working face of the tooth, and from such root or base circle the adjacent involute curves are joined by the single curve of a circle.

Having thus described my invention, I claim:

1. A hob comprising means for generating involute curves forming the whole working faces of the teeth of a gear and associated intersecting means to simultaneously generate the circular clearance space blending into said involute curves at the root circle thereof.

2. A hob of the class described comprising a series of tapered teeth arranged in the form of a helix the tops of which teeth are curved to form the curved clearance space in the gear adapted to be cut.

3. In a hob comprising a series of tapered teeth arranged in the form of a helix the tops of which teeth are curved in the form of an arc of a circle to form the curved clearance space in the gear adapted to be cut.

4. A hob comprising a series of inclined teeth arranged in the form of a helix the tops of which teeth are curved in the form of an arc of a circle, the center of which lies upon the base line and intermediate the sides of the teeth of the hob.

5. In a hob of the class described comprising a series of tapered teeth arranged in the form of a helix the tops of which teeth are curved in the form of an arc of a circle, the center of which lies upon the base line intermediate the sides of the teeth of the hob, said base line being identical with the root line and removed from the pitch line a distance corresponding to the measure of the distance between the pitch circle and base circle of the base gear of the given diametral pitch.

OLIVER G. SIMMONS.